(12) United States Patent
Niemi et al.

(10) Patent No.: US 12,193,095 B2
(45) Date of Patent: Jan. 7, 2025

(54) UE AND NETWORK BEHAVIOR AT AND AFTER A NETWORK DISASTER

(71) Applicant: MediaTek Singapore Pte. Ltd., Singapore (SG)

(72) Inventors: Marko Niemi, Oulu (FI); Yuan-Chieh Lin, Hsinchu (TW); Chien-Chun Huang-Fu, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 207 days.

(21) Appl. No.: 17/558,128

(22) Filed: Dec. 21, 2021

(65) Prior Publication Data

US 2022/0217805 A1    Jul. 7, 2022

Related U.S. Application Data

(60) Provisional application No. 63/134,603, filed on Jan. 7, 2021.

(51) Int. Cl.
*H04W 76/19* (2018.01)
*H04W 48/20* (2009.01)
*H04W 60/04* (2009.01)
*H04W 60/06* (2009.01)
*H04W 84/04* (2009.01)

(52) U.S. Cl.
CPC .......... *H04W 76/19* (2018.02); *H04W 48/20* (2013.01); *H04W 60/04* (2013.01); *H04W 60/06* (2013.01); *H04W 84/042* (2013.01)

(58) Field of Classification Search
CPC ..... H04W 76/19; H04W 48/20; H04W 60/04; H04W 60/06; H04W 84/042; H04W 48/02; H04W 4/90; H04W 76/18; H04W 76/50
See application file for complete search history.

(56) References Cited

U.S. PATENT DOCUMENTS

2020/0213938 A1    7/2020  Kim et al.
2020/0374949 A1*  11/2020  Lee ................. H04W 72/56

FOREIGN PATENT DOCUMENTS

CN        105493572 A         4/2016
WO    WO-2004103002 A1 *  11/2004  ........... H04W 60/02
WO    WO 2019122494 A1      6/2019
WO    WO-2020141956 A1 *   7/2020  ........... H04W 48/14
(Continued)

OTHER PUBLICATIONS

3GPP TR 22.831 V0.1.0, Study on Support for Minimization of Service Interruption, May 2019. (Year: 2019).*

(Continued)

*Primary Examiner* — Said M Elnoubi
(74) *Attorney, Agent, or Firm* — Andy M. Han; Han IP PLLC

(57) ABSTRACT

Solutions pertaining to user equipment (UE) and network behavior at and after a network disaster in mobile communications are proposed. An apparatus, implemented in or as a UE, determines whether a disaster condition is met with respect to a first public land mobile network (PLMN). The apparatus then selects a second PLMN according to information listing one or more PLMNs which are allowed to be selected by the UE when the disaster condition is met. The apparatus also attempts a registration in the second PLMN.

18 Claims, 9 Drawing Sheets

(56) References Cited

FOREIGN PATENT DOCUMENTS

WO   WO 2020204309 A1   10/2020
WO   WO 2021007447 A1   1/2021

OTHER PUBLICATIONS

3GPP TR 22.831 V0.1.0 , Study on Support for Minimization of Service Interruption. (Year: 2019).*
Ericsson, MINT: solution for How are UEs/subscribers notified that a "Disaster Condition" applies?, Oct. 15-23, 2020 , 3GPP TSG-CT WG1 Meeting #126-e, C1-207323) (Year: 2020).*
China National Intellectual Property Administration, First Office Action in China Patent Application No. 202111624742.8, May 30, 2023.
Ericsson: "Mint: solution for How are UE/subscribers notified that the 'Disaster Condition' no longer applies?", C1-20wxyz, 3GPP TSG-CT WG1 Meeting #127-e, Electronic meeting, Nov. 13-20, 2020.
3GPP: "On PLMN selection for MINT", S1-193281, 3GPP TSG-SA WG1 Meeting #88, Nov. 22, 2019.
3GPP: "Study on Support for Minimization of Service Interruption (Release 17)", 3GPP TR 22.831 V0.1.0 (May 2019), May 31, 2019.
Taiwan Intellctual Property Office, Office Action for Taiwan Patent Application No. 110148826, Apr. 18, 2022.

* cited by examiner

UE AND NETWORK BEHAVIOR AT AND AFTER A NETWORK DISASTER

CROSS REFERENCE TO RELATED PATENT APPLICATION(S)

The present disclosure is part of a non-provisional application claiming the priority benefit of U.S. Provisional Patent Application No. 63/134,603, filed 7 Jan. 2021, the content of which being incorporated by reference in its entirety.

TECHNICAL FIELD

The present disclosure is generally related to mobile communications and, more particularly, to user equipment (UE) and network behavior at and after a network disaster in mobile communications.

BACKGROUND

Unless otherwise indicated herein, approaches described in this section are not prior art to the claims listed below and are not admitted as prior art by inclusion in this section.

In wireless communications such as mobile communications according to the 3rd Generation Partnership Project (3GPP) specifications, support for Minimization of service Interruption (MINT) is a work item for Release 17 (Rel-17) of the 3GPP specification. In a hyper-connected society, it is of great importance to ensure that interruption of communication services is minimized. When a network cannot provide communication service(s) to its users (e.g., UEs connected to the network) due to certain events (e.g., fire or some natural disaster), it is imperative to minimize the time during which the users are out of communication service(s) and to minimize additional impact on other networks. In case a disaster happens, neighboring network(s) may provide help to users of the network that is impacted by the disaster. While one network may provide help to its neighboring network, the impact to its home users should be minimized when a large number of users request for network access. Other aspects include restriction(s) imposed on a UE from selecting other network(s) (e.g., when the UE was previously rejected to connect other network(s) before the event/disaster occurred). Therefore, there is a need for a solution regarding UE and network behavior at and after a network disaster in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose schemes, designs, concepts, techniques, methods, systems and apparatus to address aforementioned issues. Specifically, various proposed schemes in accordance with the present disclosure pertain to UE and network behavior at and after a network disaster in mobile communications.

In one aspect, a method may involve a UE determining that a disaster condition is met with respect to a first public land mobile network (PLMN). The method may also involve the UE selecting a second PLMN according to information listing one or more PLMNs which are allowed to be selected by the UE when the disaster condition is met. The method may further involve the UE attempting a registration in the second PLMN.

In another aspect, a method may involve a UE determining that a first PLMN has recovered from a disaster condition according to a received message. The method may also involve the UE performing a PLMN search responsive to the determining.

In yet another aspect, an apparatus implementable in a UE may include a transceiver and a processor coupled to the transceiver. The transceiver may be configured to communicate wirelessly. The processor may be configured to perform certain operations, including: (i) determining that a disaster condition is met with respect to a first PLMN; (ii) selecting a second PLMN according to information listing one or more PLMNs which are allowed to be selected by the UE when the disaster condition is met; and (iii) attempting a registration in the second PLMN.

It is noteworthy that, although description provided herein may be in the context of certain radio access technologies, networks and network topologies such as $5^{th}$ Generation (5G)/New Radio (NR) mobile networking and NTN communications, the proposed concepts, schemes and any variation(s)/derivative(s) thereof may be implemented in, for and by other types of wireless and wired communication technologies, networks and network topologies such as, for example and without limitation, Ethernet, Evolved Packet System (EPS), Universal Terrestrial Radio Access Network (UTRAN), Evolved UTRAN (E-UTRAN), Global System for Mobile communications (GSM), General Packet Radio Service (GPRS)/Enhanced Data rates for Global Evolution (EDGE) Radio Access Network (GERAN), Long-Term Evolution (LTE), LTE-Advanced, LTE-Advanced Pro, Internet-of-Things (IoT), Narrow Band Internet of Things (NB-IoT), Industrial Internet of Things (IIoT) and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UE and network behavior at and after a network disaster in mobile communications. According to the present disclosure, a number of possible solutions may be implemented separately or jointly. That is, although these possible solutions may be described below separately, two or more of these possible solutions may be implemented in one combination or another.

Figure 1:
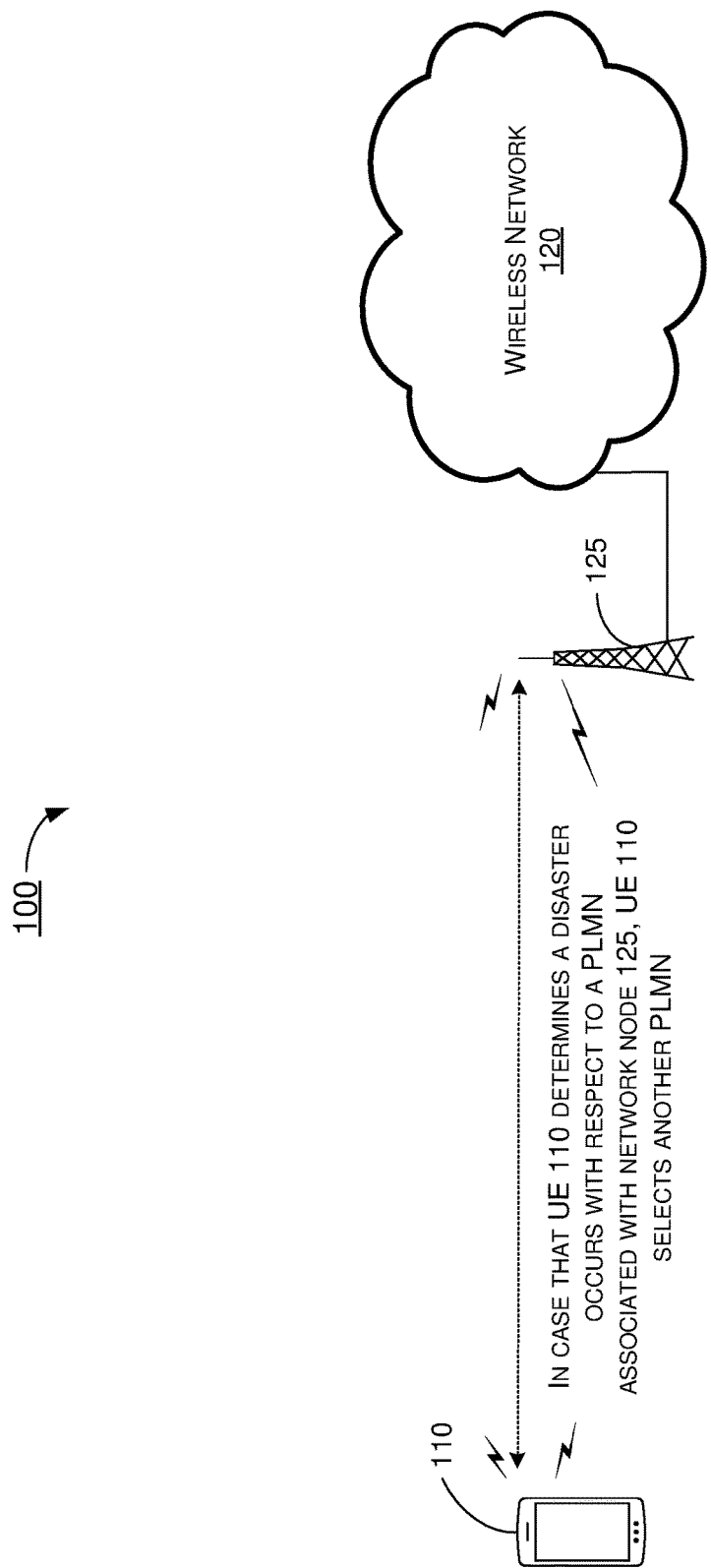
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 which may establish a wireless communication with a wireless network 120 via a network node 125 (e.g., a base station, an eNB, an gNB or a transmit/receive point (TRP)) as part of a communication network (e.g., part of a 5G NR mobile network). In network environment 100, UE 110 and network 120 (via network node 125) may implement various schemes pertaining to UE and network behavior at and after a network disaster in mobile communications in accordance with the present disclosure, as described below with reference to FIG. 2~FIG. 6. It is noteworthy that, throughout the present disclosure and in FIG. 2~FIG. 6, the term "PLMN D" refers to a PLMN in which a disaster occurs or a disaster condition applies. Moreover, the term "PLMN A" refers to a PLMN that is allowed to be selected (e.g., selectable by a UE) when the disaster occurs in the PLMN D or the disaster condition applies to the PLMN D such that UEs initially connected to PLMN D may switch to PLMN A (e.g., by registering and connecting with PLMN A).

Figure 2:
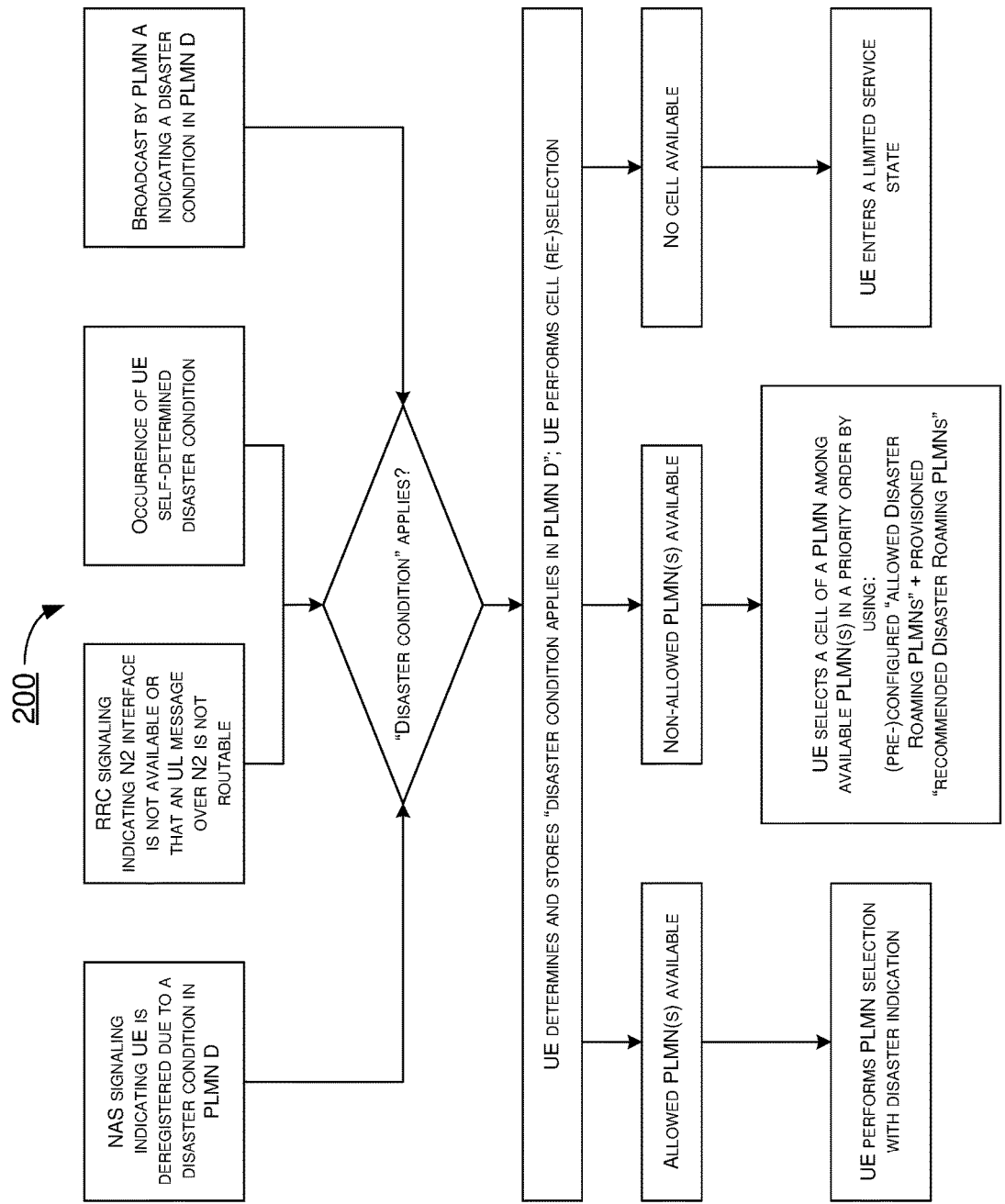
FIG. 2 is a diagram of an example scenario under a proposed scheme in accordance with an implementation of the present disclosure.

FIG. 2 illustrates an example scenario 200 under a proposed scheme in accordance with an implementation of the present disclosure. Under the proposed scheme shown in FIG. 2, two issues may be addressed, including: (1) notification to UE(s) of a disaster condition (e.g., in PLMN D), and (2) PLMN selection by a UE when a "disaster condition" applies. In scenario 200, a UE (e.g., UE 110) may determine that a disaster condition is met (or that a disaster condition applies) with respect to a first PLMN (e.g., PLMN D) based on one or more of the following: (i) an NAS signaling indicating the UE is deregistered due to the disaster condition in the first PLMN; (ii) an RRC signaling indicating that an N2 interface, which is a control plane interface between an access network and a $5^{th}$ Generation Core (5GC), is not available or that an UL message over the N2 interface is not routable; (iii) an occurrence of a UE self-determined disaster condition; and (iv) a broadcast information from a cell of second PLMN (e.g., PLMN A) indicating the disaster condition in the first PLMN. Upon determining that "disaster condition" applies to the first PLMN, the UE may store a disaster indication of "disaster condition applies in PLMN D" in a memory of UE. Accordingly, cell selection (or re-selection) may be required for the UE to connect to an PLMN allowed to be selected (e.g., PLMN A). In an event that one or more allowed PLMNs are available, the UE may perform a PLMN selection with the disaster indication stored in memory. In an event that one or more non-allowed PLMNs are available, the UE may select a cell of a PLMN among those PLMNs in a priority order by using information on: (a) configured (or pre-configured) allowed disaster roaming PLMNs, and (b) provisioned recommended disaster roaming PLMNs. In an event that no cell is available, the UE may enter a limited service state.

Figure 3:
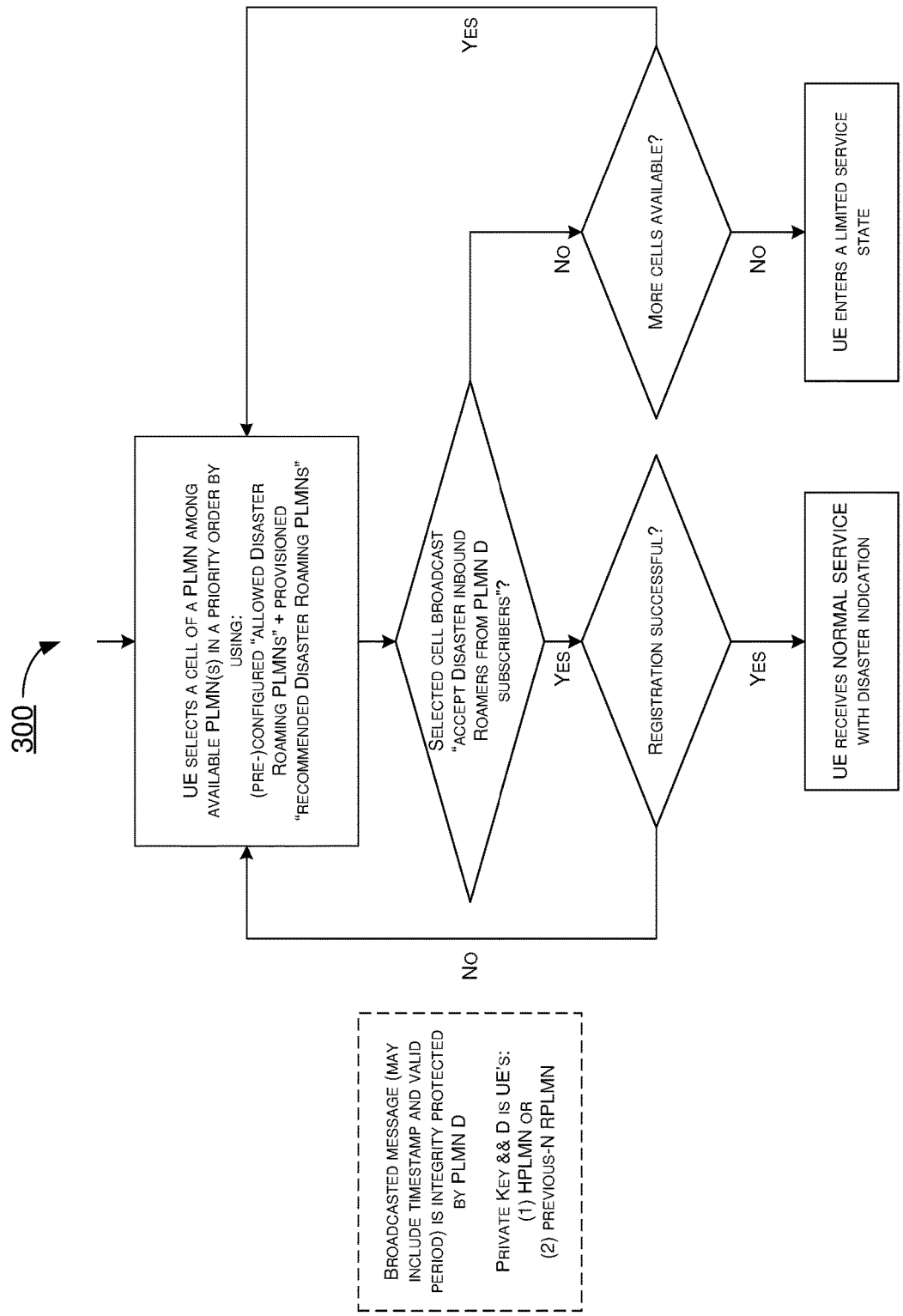
FIG. 3 is a diagram of an example scenario under a proposed scheme in accordance with an implementation of the present disclosure.

FIG. 3 illustrates an example scenario 300 under a proposed scheme in accordance with an implementation of the present disclosure. Under the proposed scheme shown in FIG. 3, two issues may be addressed, including: (1) indication to UE(s) of accessibility from other PLMNs without the disaster condition, and (2) registration to a roaming PLMN without the disaster condition in case of disaster condition in PLMN D. Scenario 300 may be considered a continuation of scenario 200 in that, in scenario 300, a UE (e.g., UE 110) may select a cell as described above with respect to scenario 200 (e.g., selecting a cell of a PLMN among those PLMNs in a priority order by using information on: (a) configured (or pre-configured) allowed disaster roaming PLMNs, and (b) provisioned recommended disaster roaming PLMNs. In an event that no cell is available, the UE may enter a limited service state). Then, the UE may determine whether there is any broadcast information from the selected PLMN indicating "accept disaster inbound roamers from PLMN D subscribers". In case of a positive determination (e.g., there is such a broadcast information), the UE may determine whether a registration with the selected PLMN is successful. If the registration is successful, the UE may receive normal service(s) with the disaster indication stored in memory. If the registration is unsuccessful, the UE may select another cell. In case of a negative determination (e.g., there is no broadcast information), the UE may determine whether there are one or more other cells allowed to be selected (e.g., selectable by a UE). In case there is no other allowed cell, the UE may enter a limited service state. In case there is at least one other cell is allowed to be selected, the UE may select the allowed cell(s).

It is noteworthy that the broadcast information may also indicate a timestamp and a valid period. Moreover, the broadcast information may be integrity protected by the PLMN with the disaster condition (e.g., PLMN D). Furthermore, a private key to decrypt the broadcast information may be based on either a home PLMN (HPLMN) of the UE or a predefined number N of previous registered PLMNs (RPLMNs).

Figure 4:
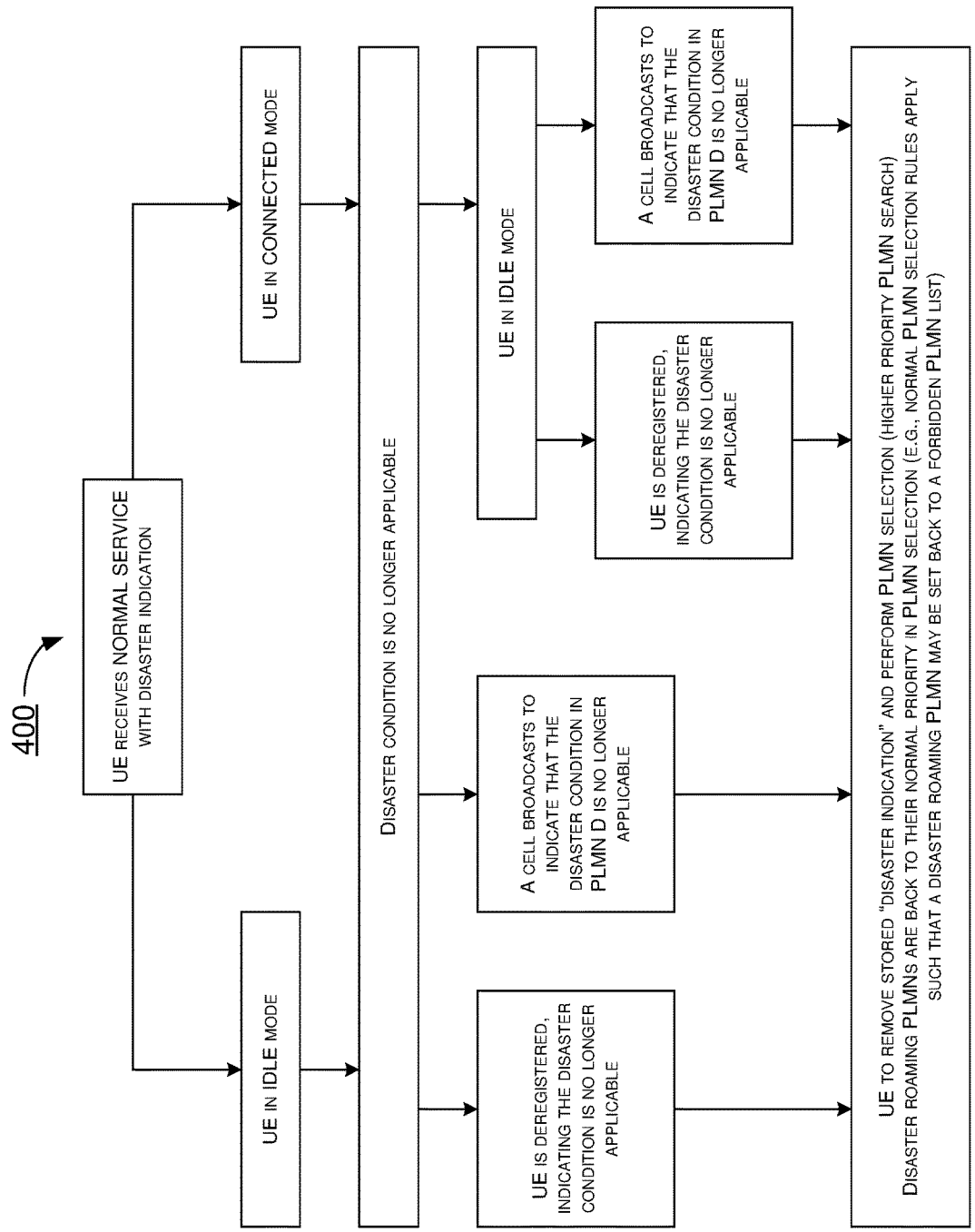
FIG. 4 is a diagram of an example scenario under a proposed scheme in accordance with an implementation of the present disclosure.

FIG. 4 illustrates an example scenario 400 under a proposed scheme in accordance with an implementation of the present disclosure. Under the proposed scheme shown in FIG. 4, one issue that may be addressed may include notification to UE(s) that the disaster condition is no longer applicable (e.g., no longer applicable in PLMN D). Scenario 400 may be considered a continuation of scenario 300 in that, in scenario 400, a UE (e.g., UE 110) may receive normal service(s) with the disaster indication stored in memory while being in an idle mode or a connected mode. Then, the UE may receive a message or signal indicating that the disaster condition is no longer applicable (e.g., no longer applicable in PLMN D). For instance, the UE may receive a broadcast information (e.g., from PLMN A or another PLMN or cell) indicating that the disaster condition in the first PLMN is no longer applicable. In response, the UE may deregister from PLMN A and remove the stored disaster indication from its memory. Additionally, the UE may perform a PLMN search (e.g., a higher-priority PLMN search). Moreover, disaster roaming PLMNs may be back to their normal priority in the PLMN selection (e.g., normal PLMN selection rules may apply such that a disaster roaming PLMN may be set back to a forbidden PLMN list).

Figure 5:
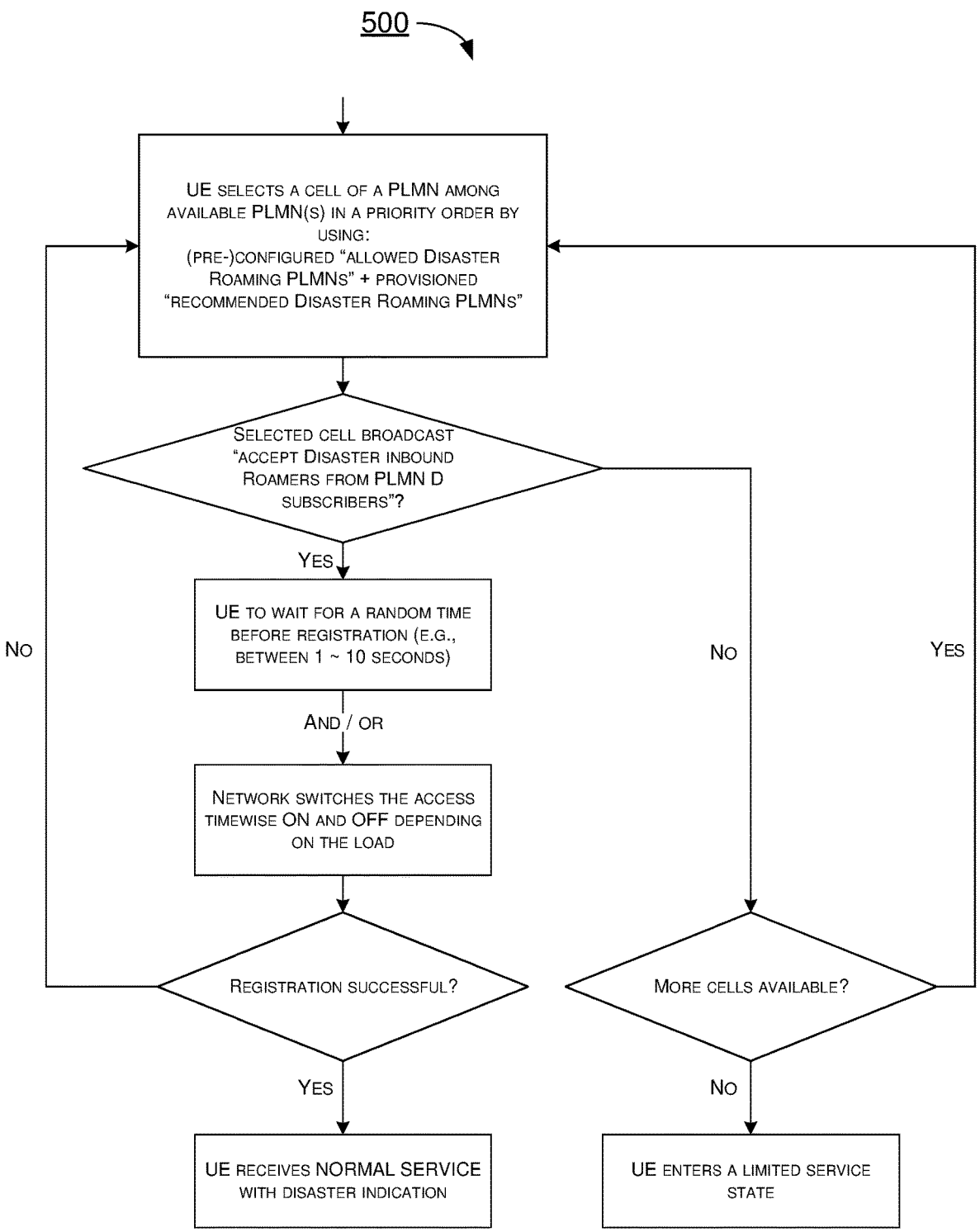
FIG. 5 is a diagram of an example scenario under a proposed scheme in accordance with an implementation of the present disclosure.

FIG. 5 illustrates an example scenario 500 under a proposed scheme in accordance with an implementation of the present disclosure. Under the proposed scheme shown in FIG. 5, one issue that may be addressed may include prevention of signaling overload in PLMNs without the disaster condition (so as not to overload such PLMNs). Scenario 500 may be considered an extension or expansion of scenario 300 in that, in scenario 500, a UE (e.g., UE 110) may, after receiving a broadcast information from the selected PLMN indicating "accept disaster inbound roamers from PLMN D subscribers", wait for a random time before registration. Alternatively, or additionally, the UE may determine that the currently-connected PLMN (e.g., PLMN A) switches an access timewise on and off, depending on its load. Then, the UE may determine whether a registration with the selected PLMN is successful. If the registration is successful, the UE may receive normal service(s) with the disaster indication stored in memory. If the registration is unsuccessful, the UE may select another cell. In case of a negative determination (e.g., there is no broadcast information), the UE may determine whether there are one or more other cells allowed to be selected (e.g., selectable by a UE). In case there is no other cell allowed to be selected, the UE may enter a limited service state. In case there is at least one other cell allowed to be selected, the UE may select the allowed cell(s).

Figure 6:
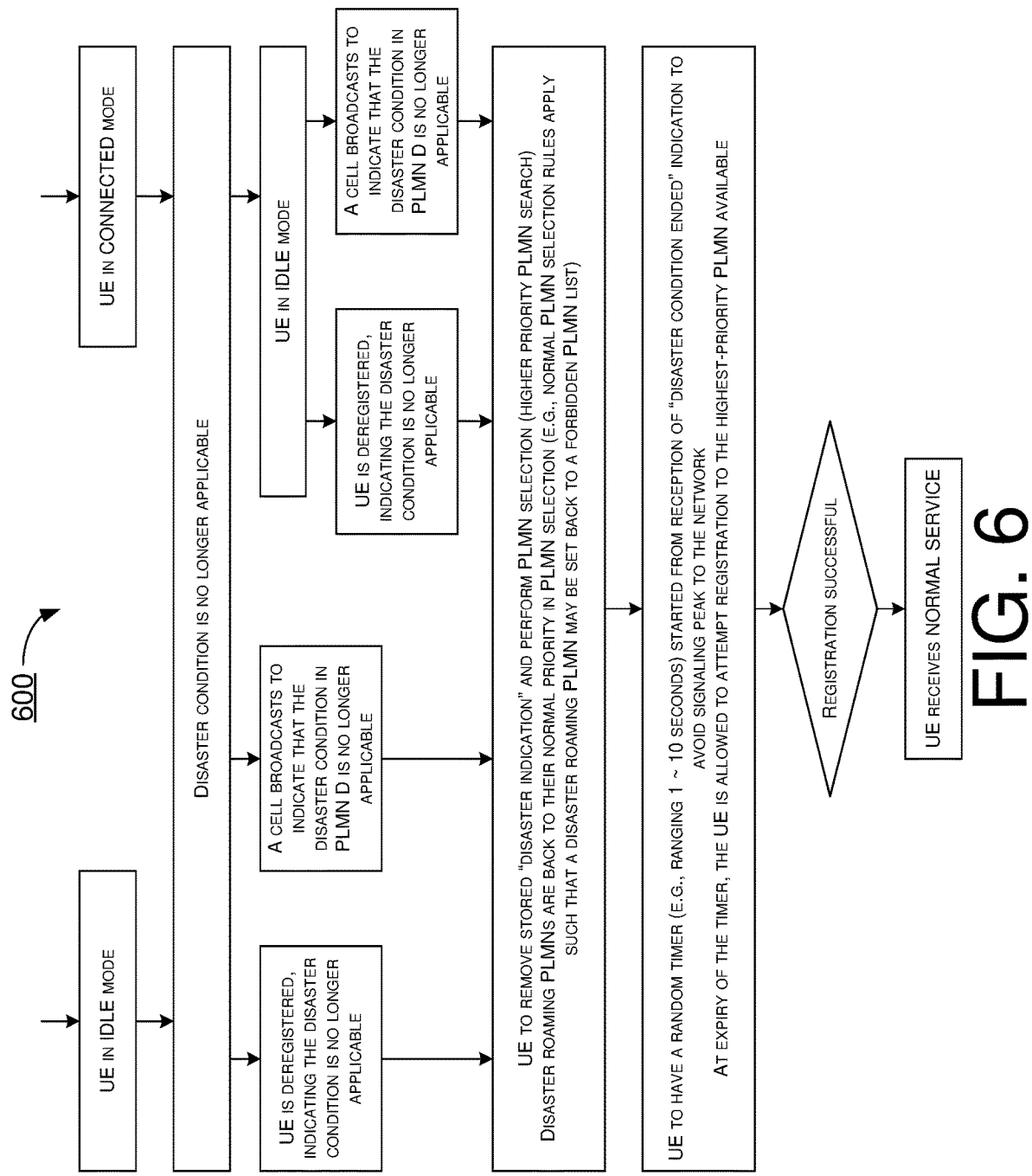
FIG. 6 is a diagram of an example scenario under a proposed scheme in accordance with an implementation of the present disclosure.

FIG. 6 illustrates an example scenario 600 under a proposed scheme in accordance with an implementation of the present disclosure. Under the proposed scheme shown in FIG. 6, one issue that may be addressed may include prevention of signaling overload by returning UEs in the PLMN previously with the disaster condition (e.g., PLMN D). Scenario 600 may be considered an extension or expansion of scenario 400 in that, in scenario 600, after removing the stored disaster indication and performing a PLMN selection, a UE (e.g., UE 110) may start a random timer (e.g., with a value range of 1~10 seconds) in response to receiving the broadcast information indicating that the disaster condition in the first PLMN (e.g., PLMN D) is no longer applicable. Additionally, the UE may attempt registration to a highest-priority PLMN from the PLMN search upon expiry of the random timer. In an event that the registration is successful, the UE may receive normal service(s).

Illustrative Implementations

Figure 7:
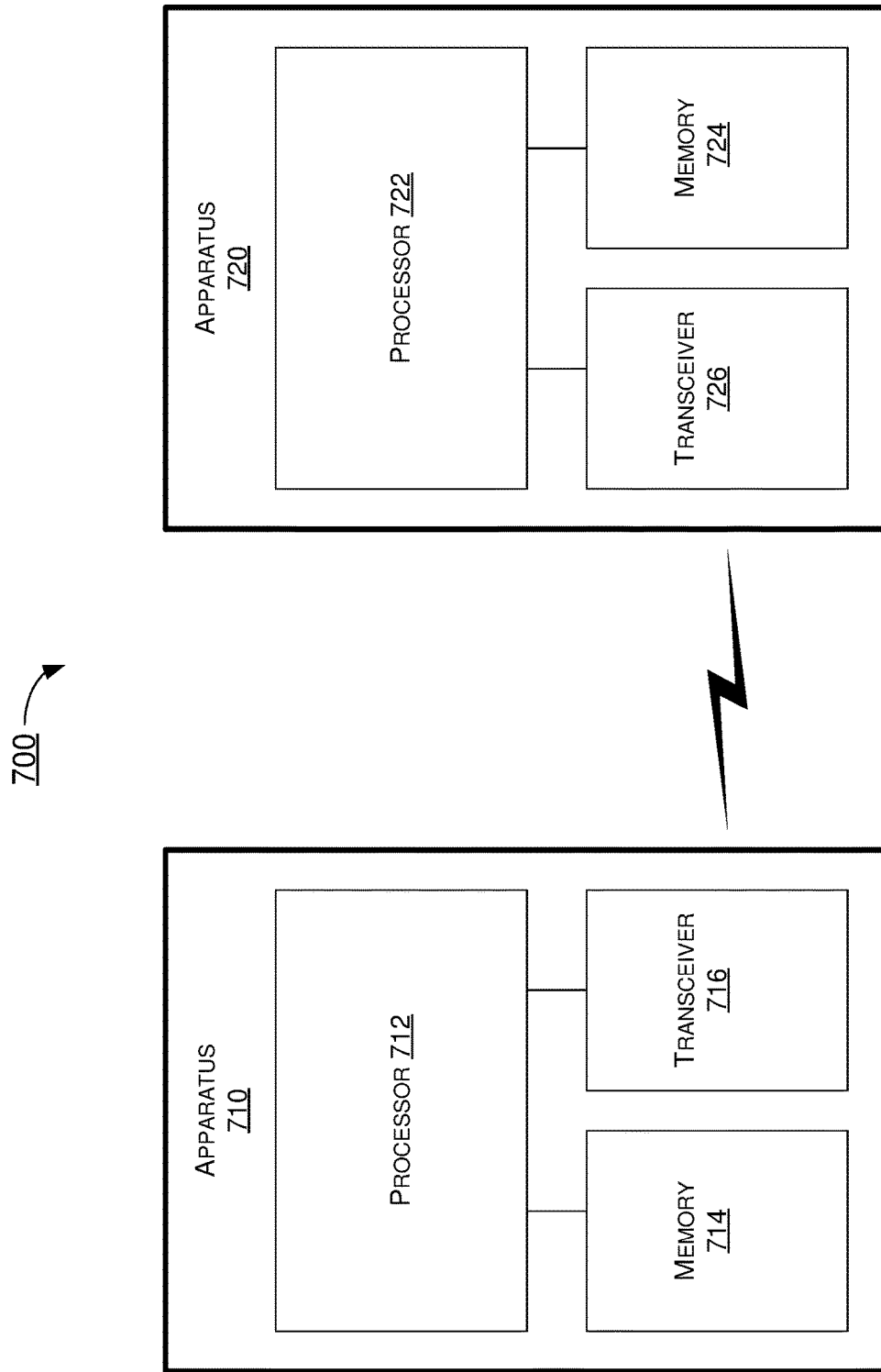
FIG. 7 is a block diagram of an example communication system in accordance with an implementation of the present disclosure.

FIG. 7 illustrates an example communication system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to UE and network behavior at and after a network disaster in mobile communications, including the various schemes described above with respect to various proposed designs, concepts, schemes, systems and methods described above, including network environment 100, as well as processes described below.

Each of apparatus 710 and apparatus 720 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 710 and apparatus 720 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in an eNodeB in an LTE, LTE-Advanced or LTE-Advanced Pro network or in a gNB or TRP in a 5G network, an NR network or an IoT network.

In some implementations, each of apparatus 710 and apparatus 720 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 710 and apparatus 720 may be implemented in or as a network apparatus or a UE. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, or one or more CISC or RISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to UE and network behavior at and after a network disaster in mobile communications in accordance with various implementations of the present disclosure.

In some implementations, apparatus 710 may also include a transceiver 716 coupled to processor 712. Transceiver 716 may be capable of wirelessly transmitting and receiving data. In some implementations, transceiver 716 may be capable of wirelessly communicating with different types of wireless networks of different radio access technologies (RATs). In some implementations, transceiver 716 may be equipped with a plurality of antenna ports (not shown) such as, for example, four antenna ports. That is, transceiver 716 may be equipped with multiple transmit antennas and multiple receive antennas for multiple-input multiple-output (MIMO) wireless communications. In some implementations, apparatus 720 may also include a transceiver 726 coupled to processor 722. Transceiver 726 may include a transceiver capable of wirelessly transmitting and receiving data. In some implementations, transceiver 726 may be capable of wirelessly communicating with different types of UEs/wireless networks of different RATs. In some implementations, transceiver 726 may be equipped with a plurality of antenna ports (not shown) such as, for example, four antenna ports. That is, transceiver 726 may be equipped with multiple transmit antennas and multiple receive antennas for MIMO wireless communications.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as a UE (e.g., UE 110), and apparatus 720, as a network node (e.g., network node 125) of a wireless network (e.g., network 120 as a 5G/NR mobile network), is provided below.

Under various proposed schemes in accordance with the present disclosure pertaining to UE and network behavior at and after a network disaster in mobile communications, processor 712 of apparatus 710, implemented in or as UE 110, may determine, via transceiver 716, whether a disaster condition is met with respect to a first PLMN. Additionally, processor 712 may select, via transceiver 716, a second PLMN according to information listing one or more PLMNs which are allowed to be selected by the UE when the disaster condition is met. Moreover, processor 712 may attempt, via transceiver 716, a registration in the second PLMN.

In some implementations, the one or more PLMNs may be allowed to be selected by the UE within, but not outside, a duration in which the disaster condition is met (e.g., the one or more available PLMNs are only selectable by the UE within the duration in which the disaster condition is met).

In some implementations, the disaster condition may be determined to be met based on one or more of the following: (a) a NAS signaling indicating that the UE is deregistered; (b) an RRC signaling indicating that an N2 interface, which is a control plane interface between an access network and a 5GC, is not available or that an UL message over the N2 interface is not routable; (c) an occurrence of a UE self-determined disaster condition; and (d) a broadcast information from the second PLMN indicating the disaster condition applies in the first PLMN.

In some implementations, the information listing the one or more PLMNs which are allowed to be selected by the UE when the disaster condition is met may be either pre-configured in the UE or received from a network.

In some implementations, the information may indicate that the one or more PLMNs are accepting disaster inbound roamers from the first PLMN.

In some implementations, processor 712 may perform additional operations. For instance, processor 712 may determine that the registration in the second PLMN is unsuccessful. Moreover, processor 712 may select, via transceiver 716, one other PLMN among the information. Alternatively, processor 712 may enter a limited service state responsive to no other PLMN among the information being allowed to be selected.

In some implementations, processor 712 may perform additional operations. For instance, processor 712 may determine that the registration in the second PLMN is successful. Moreover, processor 712 may enter a registered normal service state with a disaster indication.

In some implementations, the attempting of the registration in the second PLMN may be triggered by either or both of the following: (a) a specific period of time is elapsed; and (b) the second PLMN is allowed to be selected. In some implementations, the specific period of time may be controlled by a random timer.

Under various proposed schemes in accordance with the present disclosure pertaining to UE and network behavior at and after a network disaster in mobile communications, processor 712 of apparatus 710, implemented in or as UE 110, may determine, via transceiver 716, that a first PLMN has recovered from a disaster condition according to a received message. Moreover, processor 712 may perform, in response to the determining, a PLMN search. In some implementations, the received message may include broadcast information or a deregistration message.

In some implementations, processor 712 may perform additional operations. For instance, processor 712 may deregister apparatus 710, as a UE, from a second PLMN.

Moreover, processor 712 may remove a stored disaster indication associated to the first PLMN.

In some implementations, processor 712 may perform additional operations. For instance, responsive to a specific period of time being elapsed, processor 712 may attempt a registration in a third PLMN selected from a result of the PLMN search. In some implementations, the specific period of time may be controlled by a random timer and may be initiated responsive to the determining. In some implementations, the third PLMN may be the highest-priority PLMN allowed to be selected among a plurality of PLMNs from the result of the PLMN search.

Illustrative Processes

Figure 8:
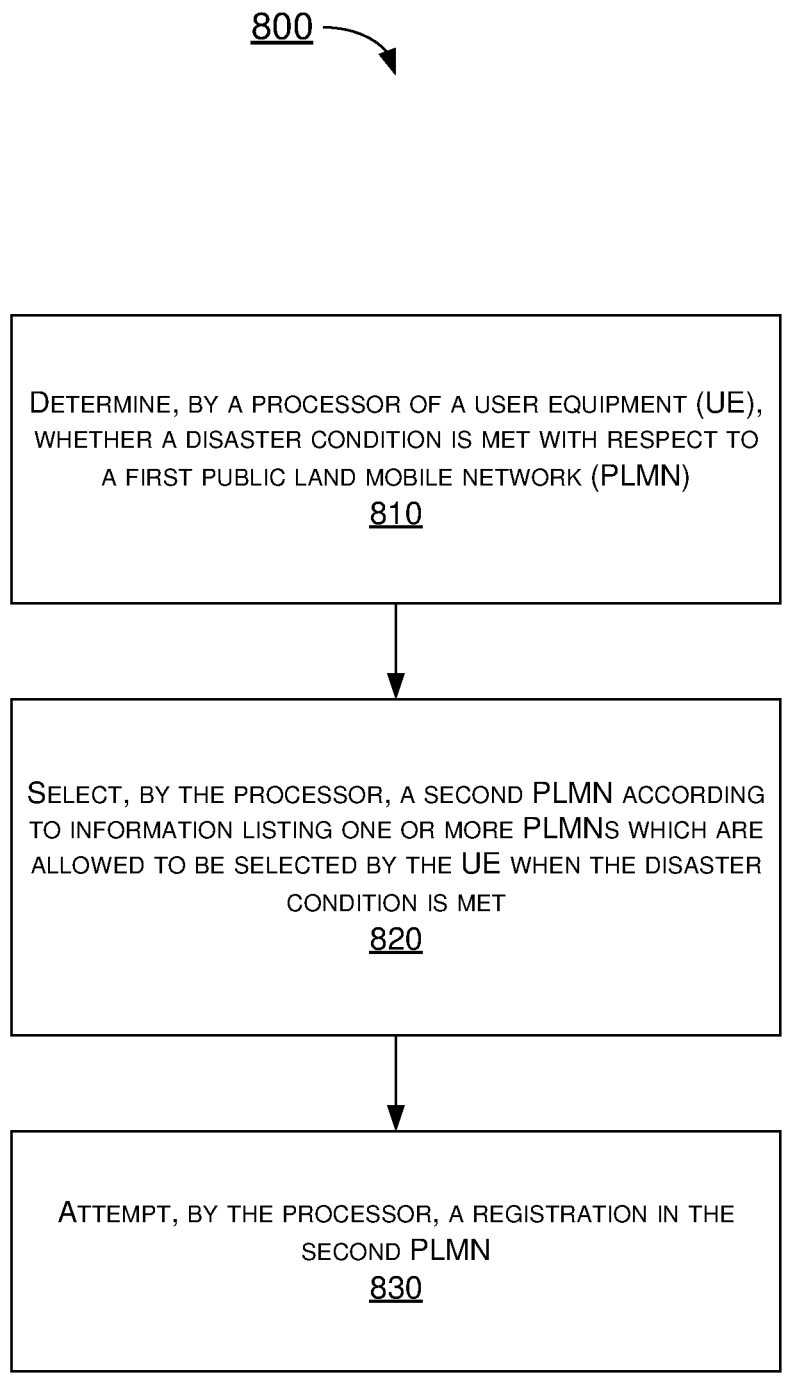
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above, whether partially or entirely, including those pertaining to those described above. More specifically, process 800 may represent an aspect of the proposed concepts and schemes pertaining to UE and network behavior at and after a network disaster in mobile communications. Process 800 may include one or more operations, actions, or functions as illustrated by one or more of blocks 810, 820 and 830. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed iteratively. Process 800 may be implemented by or in apparatus 710 and apparatus 720 as well as any variations thereof. Solely for illustrative purposes and without limiting the scope, process 800 is described below in the context of apparatus 710 as a UE (e.g., UE 110) and apparatus 720 as a communication entity such as a network node or base station (e.g., network node 125) of a mobile communication network. Process 800 may begin at block 810.

At 810, process 800 may involve processor 712 of apparatus 710 determining whether a disaster condition is met with respect to a first PLMN. Process 800 may proceed from 810 to 820.

At 820, process 800 may involve processor 712 selecting a second PLMN according to information listing one or more PLMNs which are allowed to be selected by the UE when the disaster condition is met. Process 800 may proceed from 820 to 830.

At 830, process 800 may involve processor 712 attempting a registration in the second PLMN.

In some implementations, the one or more PLMNs may be allowed to be selected by the UE within, but not outside, a duration in which the disaster condition is met (e.g., the one or more available PLMNs are only selectable by the UE within the duration in which the disaster condition is met).

In some implementations, the disaster condition may be determined to be met based on one or more of the following: (a) a NAS signaling indicating that the UE is deregistered; (b) an RRC signaling indicating that an N2 interface, which is a control plane interface between an access network and a 5GC, is not available or that an UL message over the N2 interface is not routable; (c) an occurrence of a UE self-determined disaster condition; and (d) a broadcast information from the second PLMN indicating the disaster condition applies in the first PLMN.

In some implementations, the information listing the one or more PLMNs which are allowed to be selected by the UE when the disaster condition is met may be either preconfigured in the UE or received in a configuration message from a network.

In some implementations, the information may indicate that the one or more PLMNs are accepting disaster inbound roamers from the first PLMN.

In some implementations, process 800 may involve processor 712 performing additional operations. For instance, process 800 may involve processor 712 determining that the registration in the second PLMN is unsuccessful. Moreover, process 800 may involve processor 712 selecting one other PLMN among the information. Alternatively, process 800 may involve processor 712 entering a limited service state responsive to no other PLMN among the information being allowed to be selected.

In some implementations, process 800 may involve processor 712 performing additional operations. For instance, process 800 may involve processor 712 determining that the registration in the second PLMN is successful. Moreover, process 800 may involve processor 712 entering a registered normal service state with a disaster indication.

In some implementations, the attempting of the registration in the second PLMN may be triggered by either or both of the following: (a) a specific period of time is elapsed; and (b) the second PLMN is allowed to be selected. In some implementations, the specific period of time may be controlled by a random timer.

Figure 9:
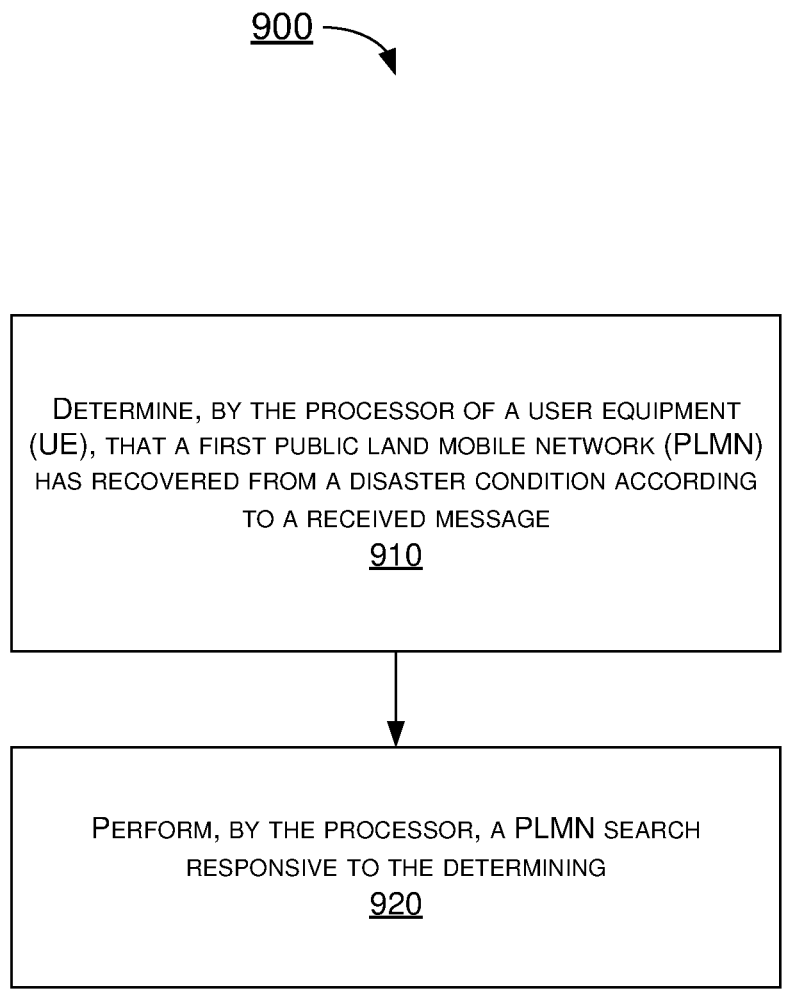
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above, whether partially or entirely, including those pertaining to those described above. More specifically, process 900 may represent an aspect of the proposed concepts and schemes pertaining to UE and network behavior at and after a network disaster in mobile communications. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed iteratively. Process 900 may be implemented by or in apparatus 710 and apparatus 720 as well as any variations thereof. Solely for illustrative purposes and without limiting the scope, process 900 is described below in the context of apparatus 710 as a UE (e.g., UE 110) and apparatus 720 as a communication entity such as a network node or base station (e.g., network node 125) of a mobile communication network. Process 900 may begin at block 910.

At 910, process 900 may involve processor 712 of apparatus 710 determining that a first PLMN has recovered from a disaster condition according to a received message. In some implementations, the received message may include broadcast information or a deregistration message. Process 900 may proceed from 910 to 920.

At 920, process 900 may involve processor 712 performing, in response to the determining, a PLMN search.

In some implementations, process 900 may involve processor 712 performing additional operations. For instance, process 900 may involve processor 712 deregistering apparatus 710, as a UE, from a second PLMN. Moreover, process 900 may involve processor 712 removing a stored disaster indication associated to the first PLMN.

In some implementations, process 900 may involve processor 712 performing additional operations. For instance, responsive to a specific period of time being elapsed, process 900 may involve processor 712 attempting a registration in a third PLMN selected from a result of the PLMN search. In some implementations, the specific period of time may be controlled by a random timer and may be initiated responsive to the determining. In some implementations, the third PLMN may be the highest-priority PLMN allowed to be selected among a plurality of PLMNs from the result of the PLMN search.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of a user equipment (UE), whether a disaster condition is met with respect to a first public land mobile network (PLMN); and
   selecting, by the processor, a second PLMN in a priority order from a listing of one or more PLMNs which are allowed to be selected by the UE when the disaster condition is met; and
   attempting, by the processor, a registration in the second PLMN,
   wherein the attempting of the registration in the second PLMN is triggered by the second PLMN being allowed to be selected and a specific period of time being elapsed, and
   wherein the listing of one or more PLMNs which are allowed to be selected by the UE when the disaster condition is met is either pre-configured in the UE or provisioned to the UE by a network.

2. The method of claim 1, wherein the one or more PLMNs are allowed to be selected by the UE within, but not outside, a duration in which the disaster condition is met.

3. The method of claim 1, wherein the disaster condition is determined to be met based on one or more of:
   a non-access stratum (NAS) signaling indicating that the UE is deregistered;
   a radio resource control (RRC) signaling indicating that an N2 interface, which is a control plane interface between an access network and a 5th Generation core (5GC), is not available or that an uplink (UL) message over the N2 interface is not routable;

an occurrence of a UE self-determined disaster condition; and a broadcast information indicating the disaster condition applies in the first PLMN.

4. The method of claim 1, wherein information listing the one or more PLMNs which are allowed to be selected by the UE when the disaster condition is met is either pre-configured in the UE or received from a network.

5. The method of claim 4, wherein the information indicates that the one or more PLMNs are accepting disaster inbound roamers from the first PLMN.

6. The method of claim 1, further comprising:
determining, by the processor, that the registration in the second PLMN is unsuccessful; and
either, by the processor:
selecting one other PLMN among the information; or
entering a limited service state responsive to no other PLMN among the information being allowed to be selected.

7. The method of claim 1, further comprising:
determining, by the processor, that the registration in the second PLMN is successful; and
entering, by the processor, a registered normal service state with a disaster indication.

8. The method of claim 1, wherein the specific period of time is controlled by a random timer.

9. A method, comprising:
determining, by the processor of a user equipment (UE), that a first public land mobile network (PLMN) has recovered from a disaster condition according to a received message;
performing, by the processor, a PLMN search responsive to the determining; and
responsive to one other PLMN being allowed to be selected, attempting, by the processor, a registration in the other PLMN selected from a result of the PLMN search responsive to the other PLMN being allowed to be selected and a specific period of time being elapsed,
wherein the disaster condition is met based on one or more of:
a non-access stratum (NAS) signaling indicating that the UE is deregistered; and
a radio resource control (RRC) signaling indicating that an N2 interface, which is a control plane interface between an access network and a 5th Generation core (5GC), is not available or that an uplink (UL) message over the N2 interface is not routable.

10. The method of claim 9, further comprising:
deregistering, by the processor, the UE from a second PLMN; and
removing, by the processor, a stored disaster indication associated to the first PLMN.

11. The method of claim 9, wherein the received message comprises broadcast information or a deregistration message.

12. The method of claim 9, wherein the specific period of time is controlled by a random timer and is initiated responsive to the determining.

13. The method of claim 9, wherein the third PLMN is a highest-priority PLMN allowed to be selected from the result of the PLMN search.

14. An apparatus implementable in a user equipment (UE), comprising:
a transceiver configured to communicate wirelessly; and
a processor coupled to the transceiver and configured to perform operations comprising:
determining, via the transceiver, whether a disaster condition is met with respect to a first public land mobile network (PLMN);
selecting, via the transceiver, a second PLMN in a priority order from a listing of one or more PLMNs which are allowed to be selected by the UE when the disaster condition is met;
attempting, via the transceiver, a registration in the second PLMN responsive to the second PLMN being allowed to be selected and a specific period of time being elapsed,
wherein the listing of one or more PLMNs which are allowed to be selected by the UE when the disaster condition is met is either pre-configured in the UE or provisioned to the UE by a network.

15. The apparatus of claim 14, wherein the one or more PLMNs are allowed to be selected by the UE within, but not outside, a duration in which the disaster condition is met.

16. The apparatus of claim 14, wherein the disaster condition is determined to be met based on one or more of:
a non-access stratum (NAS) signaling indicating that the UE is deregistered;
a radio resource control (RRC) signaling indicating that an N2 interface, which is a control plane interface between an access network and a 5th Generation core (5GC), is not available or that an uplink (UL) message over the N2 interface is not routable;
an occurrence of a UE self-determined disaster condition; and
a broadcast information indicating the disaster condition applies in the first PLMN.

17. The apparatus of claim 14, wherein the processor is further configured to perform operations comprising:
entering a limited service state responsive to no other PLMN among the information is allowed to be selected.

18. The apparatus of claim 14, wherein the processor is further configured to perform operations comprising:
determining the registration in the second PLMN is successful; and
entering a registered normal service state with a disaster indication.

* * * * *